United States Patent [19]

Salisbury et al.

[11] Patent Number: 5,562,883
[45] Date of Patent: Oct. 8, 1996

[54] SOLVENT FLUSH REACTION INJECTION MOLDING MIXHEAD

[75] Inventors: Wayne C. Salisbury, Middleton; James R. Pritchard, Somersworth; William M. Humphrey, Dover; Michael J. Provencher, Barrington, all of N.H.

[73] Assignee: Davidson Textron Inc., Dover, N.H.

[21] Appl. No.: 436,002

[22] Filed: May 5, 1995

[51] Int. Cl.$^6$ .................. B01F 5/02; B01F 5/04
[52] U.S. Cl. .......... 422/133; 422/135; 422/138; 422/224; 366/138; 366/173.1; 222/148; 222/151
[58] Field of Search ............... 422/133, 135, 422/138, 224; 366/173.1, 138; 261/DIG. 26; 222/148, 151

[56] References Cited

U.S. PATENT DOCUMENTS

| | | | |
|---|---|---|---|
| 2,847,196 | 8/1958 | Franklin et al. | 259/8 |
| 3,541,023 | 11/1970 | Coll, III | 252/359 |
| 3,769,232 | 10/1973 | Houldridge | 422/133 |
| 3,791,631 | 2/1974 | Meyer | 259/8 |
| 3,850,371 | 11/1974 | Trapp | 239/113 |
| 3,902,850 | 9/1975 | Lehnert | 422/133 |
| 4,054,481 | 10/1977 | Heffner | 156/389 |
| 4,108,606 | 8/1978 | Wingard | 422/133 |
| 4,310,493 | 1/1982 | Pisaric et al. | 422/135 |
| 4,440,320 | 4/1984 | Wernicke | 222/145 |
| 4,473,531 | 9/1984 | Macosko et al. | 422/133 |
| 4,600,312 | 7/1986 | Scrivo | 366/159 |
| 4,726,933 | 4/1988 | Mayr et al. | 422/133 |
| 4,795,336 | 1/1989 | Shannon et al. | 425/145 |
| 4,986,667 | 1/1991 | Berger | 366/173 |
| 5,086,949 | 2/1992 | Vulpitta et al. | 222/1 |
| 5,093,084 | 3/1992 | Boden et al. | 422/133 |
| 5,240,325 | 8/1993 | Monchiero | 366/138 |

*Primary Examiner*—Nina Bhat
*Attorney, Agent, or Firm*—Reising, Ethington, Barnard & Perry

[57] ABSTRACT

A solvent flush reaction injection molding mixhead has a mixing chamber with a solvent inlet port in one end and a chemical outlet port in an opposite end. A pair of hydraulically operated chemical injectors are connected to the mixing chamber between the solvent inlet port and chemical outlet port to inject liquid reaction molding chemicals at high pressure through injector ports into the mixing chamber. The mixed chemicals are delivered through the chemical outlet port to a spray wand on the mixhead for application to a mold surface or an object requiring a foam coating. A flush valve is associated with the solvent inlet port and is moveable from a closed position to block the solvent inlet port while the chemicals are injected into the mixing chamber, and an open position where liquid solvent under a high pressure is supplied through turbulator ports into the mixing chamber to clean and flush any remaining mixed chemicals from the flush valve, the mixing chamber including the chemical injector ports, and the spray wand.

15 Claims, 4 Drawing Sheets

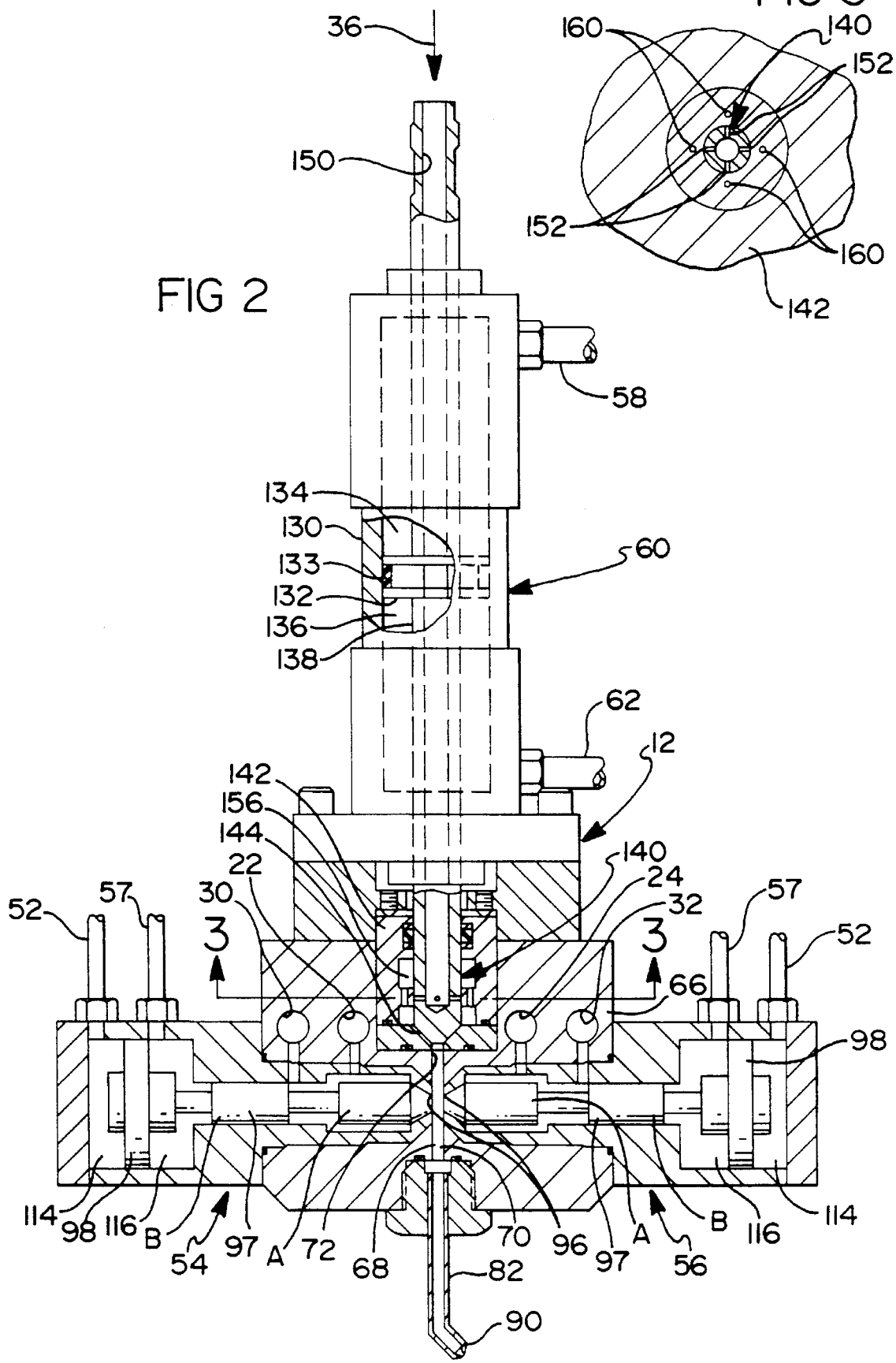

SOLVENT FLUSH REACTION INJECTION MOLDING MIXHEAD

TECHNICAL FIELD

This invention relates to reaction injection molding mixheads and more particularly to solvent flushing of the reaction molding chemicals therefrom.

BACKGROUND OF THE INVENTION

In a reaction injection molding (RIM) dispensing system such as those used to mix and dispense liquid chemical components to create a urethane foam, the liquid components are normally impingement mixed in a mixhead by injecting them through opposed injector ports into a mixing chamber in the mixhead at either a relatively low or high pressure. The mixed chemicals are dispensed therefrom as a shot by a dispensing wand that is connected to the mixing chamber at the mixhead. The dispensing wand may be a simple pipe or tube of uniform internal diameter and various lengths for dispensing the material into a mold cavity or it may have a spray tip for dispensing the material in a spray pattern onto a mold surface or an object requiring a foam coating. In the low pressure type systems, the chemicals are injected into the mixing chamber with pressures of about 50–200 psi and a mechanical aftermixer such as a spiral element is normally used between the injector ports and the outlet end of the dispensing wand to obtain thorough mixing. In the high pressure type systems, the chemicals are injected into the mixing chamber with pressures as high as 2000 psi or more to enhance their impingement mixing so that an aftermixer is not normally required.

Following each dispensing or shot of the mixed chemicals, a solvent is normally flushed through the mixhead to clean away any retained mixed chemicals in the low pressure systems but not always in the high pressure systems as the mixed chemicals are dispensed very quickly from the mixhead provided the dispensing wand is short and not a spray wand having a flow restricting spray tip or nozzle. In the high pressure mixheads, there is commonly employed a hydraulically operated injector valve/clean out plunger in the mixing chamber that opens the injector ports to admit the highly pressurized liquid chemicals into the mixing chamber and then closes and wipes these ports and the mixing chamber in both a valving and cleaning action. Depending on the particular dispensing wand being used with the high pressure mixhead, the residence or dwell time of the mixed chemicals in the mixhead including the dispensing wand may be so great as to require solvent flushing. For example, with long dispensing wands, the resulting long dwell time of the fast reacting urethane polymer in the mixing chamber and/or the dispensing wand can result in a substantial increase in the viscosity of the polymer passing through so that it can not be cleaned well following a shot and a solvent flush must then be employed. But even then, some of the reacting polymer can be left in the mixing chamber and/or dispensing wand and can build up over time with repeated use to the point where it clogs the dispensing wand and causes the injector valve/clean out plunger in a high pressure mixhead to stick. The tendency for such clogging is particularly acute in the case of a spray wand because of the spray tip at its end that back pressures the wand and mixing chamber. When the dispensing wand becomes clogged, maintenance time is then required to disassemble and clean the affected parts. And when the injector/clean out plunger sticks, the resulting stress from its hydraulically forced movement can be so high as to cause its breakage. There is a particular tendency for the reacting polymer to build up at the conventional injector valve/clean out plunger causing it to stick because it blocks the injector ports from the solvent and produces a dead space in the mixing chamber where the solvent is not able to thoroughly clean and flush the plunger of retained chemicals.

SUMMARY OF THE INVENTION

The present invention provides a more reliable high pressure mixhead that uses high pressure, turbulent solvent flushing without requiring any cleaning or wiping by an injector valve/clean out plunger in the mixing chamber. In the solvent flush reaction injection molding mixhead of the present invention, there is provided a mixing chamber having a solvent inlet port and one end and a chemical outlet port at an opposite end to which the dispensing wand or choice is connected. The dispensing wand may be a simple open pipe or tube or one with a spray tip and without the need for an aftermixer in either because of the high pressure forced, high velocity impingement mixing into the mixing chamber. A pair of hydraulically operated chemical injectors are connected to the mixing chamber between the solvent inlet port and chemical outlet port and at directly opposite locations. The chemical injectors inject the reactive liquid chemicals under high pressure through opposed injection ports into the mixing chamber where they impinge at high velocity with each other on entering and are thereby thoroughly mixed. The injectors include a hydraulically actuated valve that is adapted to close and open their injector port at the mixing chamber so as to leave no cavity at these ports in the mixing chamber where the reactive chemicals could collect. The chemical injectors also provide recirculation of the respective chemicals when they are not injecting same.

A hydraulically operated flush valve is received in the mixhead and is operated by a hydraulic piston through a piston rod to move between a closed position where the flush valve closes the solvent inlet port against the high pressure of the chemicals injected into the mixing chamber and an open position where the flush valve uncovers this port. A solvent feed passage extends through the piston rod and into the flush valve and is adapted at one end of the piston rod to receive a liquid solvent under a high pressure but less than the chemical injection pressures. A plurality of solvent feed ports is provided in the flush valve that are open to the solvent feed passage and extend radially outward therefrom in angularly spaced relationship.

A valve bore in the mixhead receives the flush valve and is adapted to block these solvent feed ports in the flush valve when in its closed position. The valve bore has an annular cavity that cooperates with the flush valve to define an annular chamber extending thereabout that opens to the solvent feed ports in the flush valve when in its open position. This valve bore is also provided with another annular cavity that cooperates with the flush valve to define another annular chamber extending thereabout that opens to the face side of this valve and the solvent inlet port when the flush valve is moved to its open position and is blocked by the flush valve from the solvent inlet port when the flush valve is moved to its closed position seating on the solvent inlet port. Another set of solvent delivery ports in the form of turbulator ports are provided in the mixhead that continuously connect the above annular chambers and extend longitudinally of the flush valve.

The turbulator ports are adapted to deliver turbulent solvent flow in the open flush valve position following a dispensing of mixed chemicals to vigorously clean and flush any remaining mixed chemicals from the flush valve and the mixing chamber including the chemical injector ports and the chemical outlet port, and the dispensing wand. And thus unlike the conventional injector valve/clean out plunger which blocks the chemical injector ports during solvent flushing and presents a dead space, the present invention forces turbulent solvent flow against the chemical injector ports and there is no dead space for the mixed chemicals to form and stick a moving part as the flush valve does not enter the mixing chamber nor is required to wipe the injector ports.

It is therefore an object of the present invention to provide a new and improved solvent flush reaction injection molding mixhead.

Another object is to provide a reaction injection molding mixhead wherein turbulent solvent flushing of the chemical injector ports and a chemical mixing chamber is effected with no dead spaces for the reacting chemicals to form and stick a moving part.

Another object is to provide a highly reliable high pressure injection molding mixhead with high pressure impingement mixing and turbulent solvent flushing.

Another object is to provide a mixhead using high pressure impingement mixing in a mixing chamber and turbulent solvent flushing that cleans the mixing chamber including the chemical injector ports.

Another object is to provide a high pressure reaction injection molding mixhead having chemical injectors providing high pressure impingement mixing in a mixing chamber, solvent delivery passages that deliver turbulent solvent flow to clean the chemical mixing chamber including the chemical injector ports and a connected dispensing wand, and a flush valve directly associated with the mixing chamber that opens to admit the solvent flow and closes to block same against the high pressure of the injected chemicals.

Another object is to provide a high pressure reaction injection molding mixhead having high pressure impingement mixing in a mixing chamber using chemical injectors and solvent flushing using a flush valve with solvent turbulator ports that deliver turbulent solvent flow to clean the injector ports and the mixing chamber and a dispensing wand that is connected to the mixing chamber to dispense the mixed chemicals.

Another object is to provide a high pressure reaction injection molding mixhead having hydraulically operated injectors injecting the chemicals at high pressure through injector ports at high velocity and in an impinging manner into a mixing chamber from which the mixed chemicals are delivered by a dispensing wand and a hydraulically operated flush valve with solvent routing passages that provide turbulent solvent flow to clean and flush the injector ports and mixing chamber and dispensing wand when the flush valve is opened following a dispensing shot of the mixed chemicals and wherein the flush valve closes to block the mixed chemicals in the mixing chamber from the solvent against the high pressure of these chemicals.

These and other objects, advantages and features of the present invention will become more apparent from the following description and accompanying drawings in which:

BRIEF DESCRIPTION OF THE DRAWINGS

FIG. 2 is an enlarged fragmentary view taken along the line 2—2 in FIG. 1 when looking in the direction of the arrows and with the flush valve and the chemical injectors in their closed position;

FIG. 3 is an enlarged view taken along the line 3—3 in FIG. 2 when looking in the direction of the arrows;

DETAILED DESCRIPTION OF THE DRAWINGS

Figure 1:
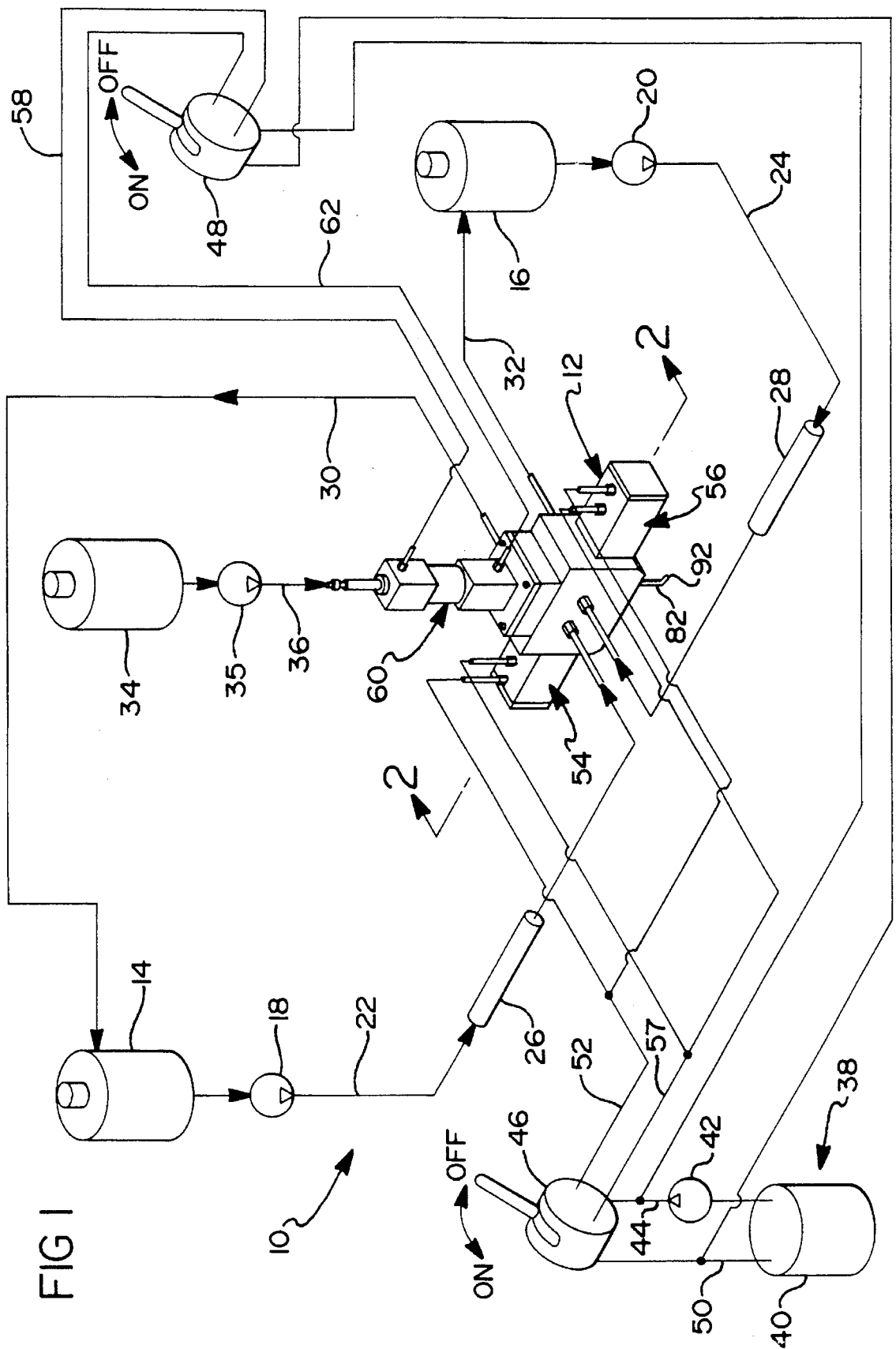
FIG. 1 is a diagrammatic view of a reaction injection molding system including a solvent flush injection molding mixhead according to the present invention.

Referring to FIG. 1, there is illustrated a reaction injection molding (RIM) system generally designated as 10 for mixing and dispensing reactive urethane foam producing chemicals into a closed mold cavity or onto an open mold surface or an object requiring a urethane foam coating. The system includes a mixhead 12 according to the present invention, agitated tanks 14 and 16 containing the liquid foam forming chemicals polyol and isocyanate, respectively, high pressure metering pumps 18 and 20 for delivering the respective chemicals in about a 1:1 ratio by feed lines 22 and 24 through heat exchangers 26 and 28, respectively, to the mixhead 12, and return lines 30 and 32, respectively, for returning the unused chemicals from the mixhead to the respective tanks for recirculation. The mixhead 12 is a compact unit that may be hand held to dispense the mixed chemicals into a mold or onto a die surface or installed in a fixed position or mounted on a movable device such as a robot arm to dispense the mixed chemicals in a certain manner such as uniform spraying onto a die surface.

The system is of the high pressure type with the pumps 18 and 20 capable of developing 2000 psi or more and would not normally include a solvent flush. The mixhead 12 of the present invention does however very effectively use a solvent flush and for that purpose there is also included in the system a tank 34 containing a solvent such as methylene chloride that is delivered at a high pressure by a pump 35 through a feed line 36 to the mixhead. The solvent pump 35 develops a high solvent feed pressure of about 1000 psi for effecting turbulent solvent cleaning and flushing action as described in further detail later; this solvent feed pressure being high but substantially less than that of the chemical injection pressure of about 2000 psi. The system further includes a hydraulic control system 38 for operating the mixhead to inject the reactive chemicals into its mixing chamber and dispense same as a shot and then operating the mixhead to deliver the solvent to internally clean and flush the mixhead after each dispensing shot.

The hydraulic control system 38 includes a tank 40 containing hydraulic fluid such as oil, a high pressure pump 42 that includes a pressure regulator and delivers the oil under high pressure (e.g. about 2000 psi) by a high pressure line 44 to a chemical injector control valve 46 and a flush control valve 48, and an exhaust line 50 that connects these valves back to the tank 40. The injector control valve 46 is operable on movement to an "ON" position to effect injection of the chemicals into the mixing chamber to the mixhead as described later. In the ON position, the control valve 46 opens the high pressure oil line 44 to an injector control line 52 that is connected to two identical, hydraulically operated chemical injectors 54 and 56 in the mixhead 12 and also opens the exhaust line 50 to another injector control line 57 leading to the chemical injectors 54 and 56.

The injector control valve 46 is operable on movement to an "OFF" position to stop the chemical injection and effect recirculation of the chemicals by reversing these connections so that the high pressure oil line 44 is then opened to the injector control line 57 and the exhaust line 50 is opened to the other injector control line 52.

The flush control valve 48 is operable on movement to an "ON" position to effect delivery of the solvent to clean and flush the mixhead by opening the high pressure oil line 44 to a flush control line 58 connected to a hydraulically operated flush valve device 60 at the mixhead 12 while opening the exhaust line 50 to another flush control line 62 connected to the flush valve device 60. The flush control valve 48 is operable on movement to an "OFF" to stop the solvent cleaning by reversing these connections to the flush valve device 60 so that the high pressure oil line 44 is then opened to the flush control line 62 and the exhaust line 50 is opened to the other flush control line 58.

Both the injector control valve 46 and the flush control valve 48 are illustrated as being of the manual rotary type. However, it will be understood that they may be of any suitable type for providing the above valving action and may be operated in the proper manner as later described either manually or by a suitable control circuit. The latter, for example, may be of the pneumatic, hydraulic or electrical type and may include a programmable logic controller for scheduling and timing the desired mixhead dispensing and flushing action for different dispensing applications. Furthermore, the injector and flush control valve could be combined as a single control valve which is then controlled with a single manual actuator or suitable system control circuit.

Referring to FIGS. 2–5, the mixhead 12 comprises a body 66 having a mixing chamber 68 in the form of a straight cylindrical bore with a chemical outlet port 70 at one end and a solvent inlet port 72 at an opposite end and two identical chemical injector accommodating ports 74 and 76 that are located diametrically opposite each other and midway between the chemical outlet port 70 and solvent inlet port 72. The solvent inlet port 72 has a tapered seat 77 and may be formed directly on the mixhead body or in a tool steel insert 78 as illustrated that is inserted in the bottom of a counterbore 80 formed in the mixhead body concentric with the mixing chamber bore. A dispensing wand 82 for dispensing the mixed chemicals is connected to the chemical outlet port 70 with a gland nut 84 that threads into the mixhead body. The dispensing wand may be of various lengths and take various forms such as a simple pipe or tube of uniform internal diameter for dispensing into a mold cavity or it may be a spray wand as illustrated with a spray nozzle 90 at its distal end as illustrated for spraying the mixed chemicals onto a mold surface or directly onto an object such as a vehicle interior trim panel requiring a foam backing. It will also be understood that the dispensing wand is preferably as short as possible for a particular dispensing application to minimize the dwell time of the mixed chemicals in the mixing chamber and wand.

The hydraulically operated chemical injectors 54 and 56 are identical and are associated with the respective injection entry ports 74 and 76. The chemical injectors are operable to (1) inject the liquid reaction molding chemicals through the respective injection entry ports 74 and 76 into the mixing chamber where they impinge at high velocity with each other on entering and are thereby thoroughly mixed, and (2) block such injection at the end of a dispensing shot and then provide for separate recirculation of the respective chemicals by routing them back to their respective tanks for future use. The chemical injectors each include a stepped cylindrical valve body 92 that is sealingly mounted with O-rings in a correspondingly stepped counterbore 94 in the mixhead body 66 concentric with the respective injector accommodating ports in the mixhead body.

The injector valve body 92 has a tapered nozzle end that sealingly fits against a correspondingly shaped backside of the associated injector accommodating port 74 and 76 to thus fill the latter where the counterbore 94 intersects with the mixing chamber. The nozzle end has a central chemical injector port 96 that is opened and closed by a hydraulically actuated spool type valve 97 having lands A and B of equal diameter and a piston 98 of larger diameter that is received and contained in a correspondingly stepped bore 100 in each valve body. The injector valve 97 are formed at one end with a tapered valve face 102 that seats on a correspondingly shaped valve seat in the injector port 96 to close same. The valves 97 are further formed at this end with a flat head 105 whose surface in this closed position aligns flush with the surface of the mixing chamber 68 as illustrated in FIGS. 2 and 5 so as to leave no cavity in the mixing chamber at the chemical injectors where the respective chemicals could possibly collect following a dispensing and also during solvent flushing.

Figure 4:
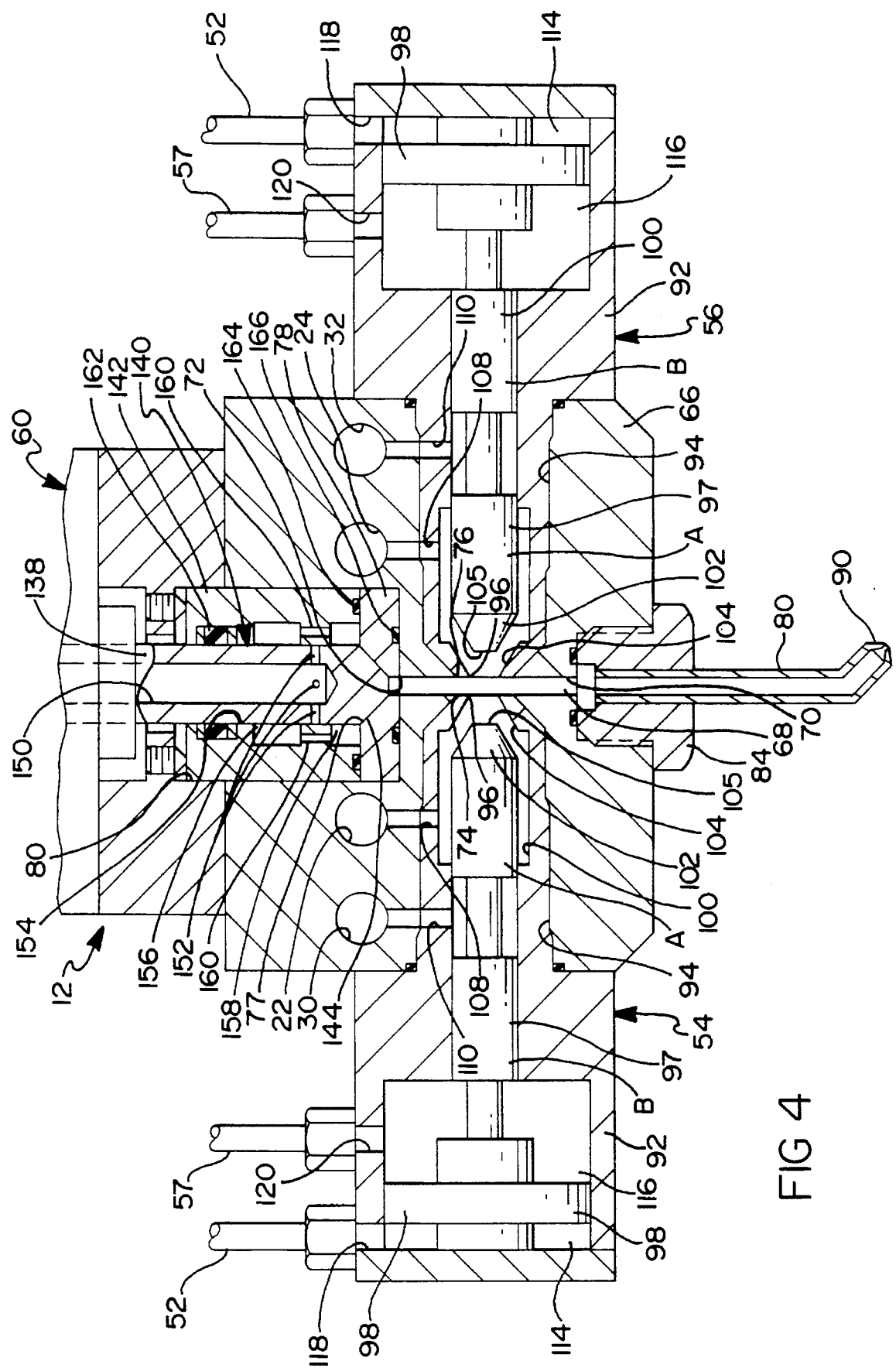
FIG. 4 is an enlarged partial view of FIG. 2 but showing the chemical injectors in their open position.
Figure 5:
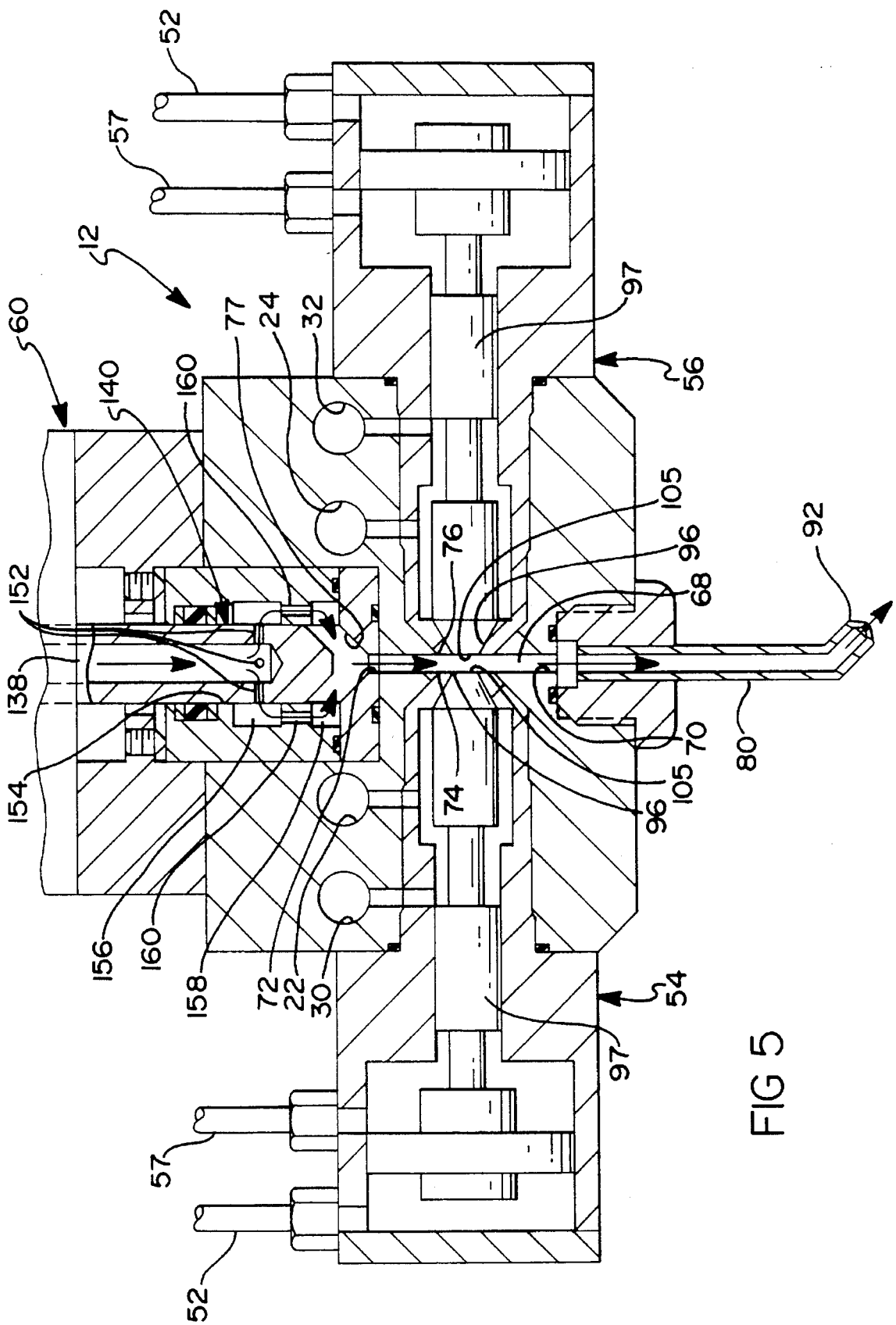
FIG. 5 is an enlarged partial view of FIG. 2 but showing the flush valve in its open position.

The injector valve 97, when in an injection-off/recirculation-on position shown in FIGS. 2 and 5, provide recirculation of the chemicals when not being dispensed by forming a connection between their lands A and B in their stepped valve bore between a feed port 108 and a return port 110 in the valve body which are connected to the respective chemical feed and return lines; the feed port 108 and return port 100 in the chemical injector 54 being connected to the one chemical feed line 22 and return line 30, respectively, for the polyol, respectively, and the feed port 108 and return port 110 in the other chemical injector 56 being connected to the other chemical feed line 24 and return line 32, respectively, for the isocyanate. The injector valves 97 are moveable from their injection-off/recirculation-on position to a retracted injection-on position shown in FIG. 4 where their land A blocks the return port 110 at the valve bore 100 while opening their feed port 108 to the injector port 96 to inject the chemical being delivered to this feed port into the mixing chamber 68.

The injector valves are hydraulically moved and held in their two different positions by their piston 98 which cooperates on opposite sides thereof with the valve body in the bore 100 to define chambers 114 and 116 at these opposite piston sides. The chambers 114 and 116 are open to ports 118 and 120 in the valve body 92 that are connected by passages in the mixhead body 66 to the respective hydraulic control lines 52 and 57 from the injector control valve 46. When the injector control valve 46 is moved to its OFF position, hydraulic fluid under pressure is thus delivered to the piston chamber 114 of both the injectors 54 and 56 while their other piston chamber 116 is exhausted through the injector control valve and this hydraulic pressure acting on their piston 98 moves their injector valve 97 from its injecting or open position shown in FIG. 4 to its injection-off/recirculation-on position shown in FIGS. 2 and 5. This hydraulic pressure then maintains these injector valve positions with a large amount of force to hold their injection port 96 closed against the force of the high pressure turbulent solvent flush action later described and their feed and return ports 108 and 110 open to each other for return of the chemicals back to their respective tanks. When the injector control valve 46 is moved to its ON position, this hydraulic pressure is applied to the piston 98 in the opposite direction in both the injectors 54 and 56 and their valve 97 is moved thereby to its injection-on position shown in FIG. 4. In this position, the injector valves 92 open their injection port 96 while blocking their return port 110 and leaving their feed port 108 open to their then open injector port 96 to inject the respective chemicals at high velocity with the high injector pressures to impinge on each other in the mixing chamber 68 and thereby provide their thorough mixing prior to reaching the chemical outlet port 70 and connected dispensing wand 80.

Referring to FIG. 2, the flush valve device 60 includes a hydraulic cylinder 130 that is mounted on top of the mixhead body 66 and has a piston 132 with a sealing ring 133 that is received therein and cooperates therewith to define chambers 134 and 136 on opposite sides of the piston. The chambers 134 and 136 are connected to the hydraulic control lines 58 and 62, respectively, so as to effect movement of the piston under the control of the flush control valve 48. When the latter is in its OFF position, hydraulic fluid under pressure is delivered to chamber 134 while the other chamber 136 is exhausted to thus force the piston downward. When the flush control valve is moved to its ON position, the hydraulic fluid is then delivered to the chamber 136 while the other chamber 134 is exhausted to thus force the piston upward.

A cylindrical rod 138 is connected to the center of the piston 132 and is slidably, sealingly mounted in and projects from opposite ends of the cylinder 130. The piston rod 138 may be formed integral with the piston or as a separate part that is rigidly joined by suitable means with the piston. The lower end of the piston rod 138 defines a cylindrically shaped flush valve 140 that is received in a valve body 142 mounted in the counterbore 80 in the mixhead body 66. The flush valve 140 has a tapered valve face 144 that is positioned by downward movement of the piston 132 to seat on the solvent inlet port valve seat 77 to close the solvent inlet port 72 as illustrated in FIGS. 2 and 4 when the flush control valve 48 is turned OFF and is positioned by upward piston movement to open or uncover the solvent inlet port as illustrated in FIG. 5 when the flush control valve is turned ON. In the former position, the hydraulic pressure on the piston holds the flush valve closed with a force sufficient to withstand the highest anticipated pressures of the chemicals being injected and mixed in the mixing chamber. And the tapered shape of the flush valve and its seat provides a large valve seating area while exposing only a small area of this valve to the back pressures in the mixing chamber to thereby maximize the effectiveness of the hydraulically forced flush valve closure to prevent the high pressure chemicals from entering the solvent system.

A solvent delivery or feed passage 150 in the form of a straight blind bore extends centrally through the piston rod 138 and piston 132 from the upper end of the piston rod where it is connected to the solvent feed line 36 down into the flush valve 140 where it terminates at a point behind its valve face 144. A plurality of solvent delivery or feed ports 152 are provided in the flush valve 140 that are open to the solvent delivery passage 150 and extend radially outward therefrom in angularly spaced relationship near its lower closed end. In the preferred embodiment, there are four of these ports of equal diameter that as illustrated in FIG. 3 are equally angularly spaced and located in a common radial plane to provide evenly distributed solvent flow streams that contribute to the efficiency of the flushing action.

The flush valve body 142 has a bore 154 that receives the cylindrical surface of the flush valve 140 and blocks these solvent feed ports in the flush valve when in its closed position to initially ensure against the high pressure solvent reaching the mixing chamber during chemical injection. The valve body bore has an annular cavity that cooperates with the flush valve to define an annular chamber 156 that extends thereabout and opens to the solvent feed ports when the flush valve is moved to its open position. The valve body 142 is provided with another annular cavity in its bore 154 that cooperates with the flush valve to define another annular chamber 158 extending thereabout that is adjacent to the solvent inlet port and opens to the seating side of this valve and the solvent inlet port when the flush valve is moved to its open position and is closed by the flush valve from the solvent inlet port when the flush valve is moved to its closed position. Another set of solvent delivery ports 160 in the form of turbulator ports is provided in the flush valve body 142 that continuously connect the annular chambers 156 and 158 and extend longitudinally of the flush valve parallel with its center line. Preferably, there are four such turbulator ports 160 of equal diameter that are equally angularly and radially spaced about the head of the flush valve as illustrated in FIG. 3 to provide uniformly distributed turbulent flow streams to contribute to the efficiency of the flushing. The turbulator ports are sized in relation to the available solvent flow rate to deliver turbulent solvent flow in the open flush valve position; such turbulent flow occurring at a Reynolds number of about 500 and greater. To ensure against escape of the solvent in the mixhead, there is provided a seal 162 in the flush valve body between the chamber 156 and the flush valve, a seal 164 between the flush valve body and the valve seat insert 78 and a seal 166 between this insert and the bottom of the counterbore 80 in the mixhead body receiving same.

The flushing is effected by operation of the flush control valve 48 to condition the flush valve 140 as illustrated in FIG. 5 following a dispensing of mixed chemicals on closure of the chemical injectors 54 and 56 with the injector control valve 46. The turbulent solvent action provided by the turbulator ports 160 vigorously cleans and flushes any remaining mixed chemicals from the flush valve face 144 and the mixing chamber 68 including the solvent inlet port 72 and seat 77 and the chemical injection ports 96 and injector valve heads 105 and the chemical outlet port 70, and the dispensing wand 80. The multiple solvent flow paths including the turbulent solvent action issuing from the turbulator ports 160 is depicted by the arrows in FIG. 5. And thus unlike the conventional injector valve/clean out plunger which operates in the mixing chamber and blocks the chemical injector ports during solvent flushing and presents a dead space, the present invention has the flush valve located outside the mixing chamber and forces turbulent solvent flow against and across these ports and there is no dead space to form and stick a moving part in the mixhead.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A solvent flush reaction injection molding mixhead comprising a mixhead body having a longitudinal mixing chamber with a solvent inlet port at one end of said chamber and a chemical outlet port at an opposite end thereof, and a pair of opposed chemical injection ports provided between said inlet and outlet ports each communicating with an associated chemical injector valve operable to inject reactive injection molding chemicals under pressure and in an impinging manner into said mixing chamber downstream of said solvent inlet port and upstream of said chemical outlet port, a dispensing wand connected to said chemical outlet port for dispensing the mixed chemicals from said mixing chamber, and a flush valve device including a plurality of turbulator ports incorporated in said mixhead body and a valve member movable between an open condition to permit a turbulent flow of said solvent to enter said mixing chamber through said solvent inlet port and flow past said chemical injectors and out through said dispensing wand while said chemical injectors are inoperative and not injecting chemicals into said mixing chamber, and a closed position to block said solvent inlet port and thus preclude the flow of solvent into said mixing chamber while said chemical injectors are operative and injecting chemicals into said mixing chamber.

2. A solvent flush reaction injection molding mixhead as defined in claim 1 wherein a hydraulic pressure operated device is connected to operate said flush valve device.

3. A solvent flush reaction injection molding mixhead as defined in claim 1 wherein hydraulic pressure operated devices are connected to operate said chemical injectors.

4. A solvent flush reaction injection molding mixhead as defined in claim 1 wherein said flush valve device and said chemical injectors are operated with hydraulic pressure operated devices.

5. A solvent flush reaction injection molding mixhead as defined in claim 1 wherein said mixing chamber is defined by a straight passage, said solvent inlet port is located in one end of said straight passage and said chemical outlet port is located in an opposite end of said straight passage.

6. A solvent flush reaction injection molding mixhead as defined in claim 1 wherein said mixhead body has a surface defining said mixing chamber, said chemical injectors each include a valve member operable to open and close said injector ports, said valve members having a head with a surface that is flush with the surface of said mixing chamber when said valve members close the respective injector ports.

7. A solvent flush reaction injection molding mixhead as defined in claim 1 wherein said solvent inlet port has a frustra conical valve seat, and said movable valve member of said flush valve device having a frustra conical valve face that seats on said valve seat to close said solvent inlet port.

8. A solvent flush reaction injection molding mixhead as defined in claim 1 wherein said flush valve device includes, a valve bore in said mixhead body receiving said valve member, said valve member having a valve face that is operable to open and close said solvent inlet port with respect to said turbulator ports with movement of said valve member, said valve member having a solvent feed passage that is adapted to be connected to a source of liquid solvent under pressure and is open to a plurality of solvent feed ports that extend out to said valve bore, said valve bore adapted to block said solvent feed ports while said valve face closes said solvent inlet port, and a chamber open to said solvent turbulator ports and associated with said valve bore so as to open said solvent feed ports to said turbulator ports while said valve face opens said solvent inlet port to said turbulator ports.

9. A solvent flush reaction injection molding mixhead as defined in claim 1 wherein said flush valve device is operated with a hydraulic device including a piston and rod, said valve member joined with said rod, a valve bore in said mixhead body receiving said valve member, said valve member having a valve face that is operable to open and close said solvent inlet port with respect to said turbulator ports with movement of said valve member, said valve member having a solvent feed passage that extends through said rod and piston and is adapted to be connected to a source of liquid solvent under pressure, said valve member having a plurality of solvent feed ports that extend from said solvent feed passage out to said valve bore, said valve bore adapted to block said solvent feed ports while said valve face closes said solvent inlet port, and a chamber open to said solvent turbulator ports and associated with said valve bore and valve member so as to open said solvent feed ports to said turbulator ports while said valve face opens said solvent inlet port to said turbulator ports.

10. A solvent flush reaction injection molding mixhead as defined in claim 9 wherein said flush valve device includes a chamber open to said turbulator ports and adjacent said solvent inlet port and associated with said valve member so as to open said turbulator ports to said valve face and said solvent inlet port when said valve member is moved to open said solvent inlet port.

11. A solvent flush reaction injection molding mixhead as defined in claim 10 wherein both said chambers extend annularly about said valve member, said solvent feed ports extend radially of said valve member, and said turbulator ports extend longitudinally of said valve bore and are located radially outward of said valve bore.

12. A solvent flush reaction injection molding mixhead as defined in claim 11 wherein said solvent feed ports are substantially equally angularly spaced in a common plane transverse to said valve member, and said turbulator ports are substantially equally angularly and radially spaced relative to each other.

13. A solvent flush reaction injection molding mixhead as defined in claim 9 wherein said solvent feed ports extend radially of said valve member, and said turbulator ports extend longitudinally thereof.

14. A solvent flush reaction injection molding mixhead as defined in claim 9 wherein said turbulator ports are substantially equally angularly and radially spaced relative to said valve member.

15. A solvent flush reaction injection molding mixhead as defined in claim 9 wherein said solvent feed ports extend radially outward from said solvent feed passage in a common plane transverse to said valve member and are substantially equally angularly spaced relative to each other.

* * * * *